---
United States Patent Office 3,567,512
Patented Mar. 2, 1971

---

3,567,512
PROCESS FOR THE PURIFICATION OF SUGAR BEET DIFFUSION JUICE
John W. Lyons, St. Louis, and Charles E. Miles, Ballwin, Mo., assignors to Monsanto Company, St. Louis, Mo.
No Drawing. Filed June 17, 1968, Ser. No. 737,346
Int. Cl. C13d 3/02, 3/14
U.S. Cl. 127—48                           9 Claims

---

ABSTRACT OF THE DISCLOSURE

A process for purifying sugar beet diffusion juice which involves treating said juice with calcium oxide, phosphoric acid and a polyelectrolyte. An anionic, cationic or nonionic polyelectrolyte can be used.

---

This invention relates to novel processes for the purification of sugar beet diffusion juice, more specifically, this invention relates to the purification of sugar beet diffusion juice by a calcium oxide phosphoric acid treatment.

In processing sugar beets, they are cut into slim slices called cossettes from which the sugar is extracted. The extraction can take place in a number of diffusion cells which are closed, cylindrical tanks arranged in either circular or linear formation, each holding about 5 tons of cossettes. Here, hot water is percolated counter-currently through the series of operating cells. The temperature is generally kept at about 80° C. and the sugar passes into solution along with the soluble impurities. The solution running from the last filled cell is called the diffusion juice and it contains about 10 to 15% of sugar representing about 98% of the sugar contained in the sliced beets. This juice has an apparent purity of about 85, which is the ratio of sugar solids to total soluble solids in the juice. Total soluble solids are determined by a Brix Spindle, and sugar solids by a polarimeter. This method is more specifically described in Official and Tentative Methods of Analysis, of the A.O.A.C., Washington, D.C., Association of Official Agricultural Chemists, fifth edition, 1940, pages 485–491. Usually the warm diffusion juice from the sugar beet cossettes is processed by adding about 2% to about 3% calcium oxide bringing the pH to about 12 to about 12.5 at 25° C. The large quantities of lime used are obtained by burning limestone mixed with coke, usually in Belgium type kilns. The juice is then subjected to the first carbonation step which involves adding carbon dioxide to the calcium oxide containing juice until an optimum point of alkalinity about 11.2 at 25° C. and filterability is reached. Some of the impurities and calcium carbonate are removed by filtering the juice. A second carbonation of the relatively clear first filtration juice brings the pH to about 9.2 at 25° C. with relatively slight precipitation. Filtration then gives a clear diffusion juice which is ready for evaporation and further processing. This juice has a purity of approximately 89–90. The voluminous precipitate of calcium carbonate and organic matter, about 100 pounds of dry matter per ton of beets, is usually discarded into a lime pond.

The cane sugar industry has long recognized the beneficial effects derived from using phosphoric acid in the refining of sugar. Presently, cane sugar refiners use considerable amounts of phosphoric acid to produce a more brilliant, color stable, high quality juice for feed to crystallizers. Previous attempts of using phosphoric acid in the commercial purification of sugar beet diffusion juice have met with only limited success due mainly to the inability to remove the impurities from the sugar beet diffusion juice. It will be seen therefore, that a commercial process for the purification of sugar beet diffusion juice using a calcium oxide phosphoric acid treatment, which enables the impurities and the calcium phosphorus containing material to be readily removed resulting in a diffusion juice of good purity and has the additional advantage of producing a reaction product, containing the calcium phosphorus containing material and the impurities, which is suitable as an animal feed supplement is an advancement in the art.

In accordance with this invention, sugar beet diffusion juice having an apparent purity of at least 89 is prepared by forming a mixture of calcium oxide and beet diffusion juice, maintaining the pH of the said mixture from about 7 to about 11.9 by the addition of phosphoric acid, adding a polyelectrolyte to form a separable two phase system and then separating the solid phase from the diffusion juice. According to novel processes, the impurities are readily removed in one step whereas the standard calcium oxide carbon dioxide treatment requires two removal steps. Because of the appreciable amounts of lime used in the prior art treatments (2–3%) large amounts of waste materials are produced which create disposal problems. Since the novel process uses a much smaller amount of calcium oxide, some processing equipment such as lime kilns and separating equipment, can be reduced or eliminated. By using the calcium phosphorous containing material as an animal feed supplement, disposal problems are greatly reduced or eliminated.

Although any amount up to about 50% by weight of calcium oxide can be used in accordance with the novel process of this invention generally amounts from about 0.2% to about 2% by weight based on the weight of the juice are used. Calcium oxide used in excess of about 2% lead to increased processing costs and increased equipment needs. It is generally preferred to use about 0.4% to about 1% by weight based on the weight of the juice. As mentioned before by using a smaller amount of calcium oxide, lime kiln requirements are decreased along with potential disposal problems.

Calcium oxide can be added in a solid form, although it is more preferable to prepare an aqueous slurry of the calcium oxide, and add this in the correct proportion to the beet diffusion juice. The calcium oxide and the juice should be mixed until there is a thorough dispersion of the lime in the juice and the pH of the juice is at the desired level, which can readily be accomplished by those skilled in the art.

In accordance with this invention, the phosphoric acids that can be used include orthophosphoric acid and the condensed phosphoric acids. Orthophosphoric acid having a $P_2O_5$ content of about 72% by weight can be used in the novel process of this invention. Aqueous solutions of orthophosphoric acid, having a $P_2O_5$ content of at least 1% by weight can be used, and it is preferred to use an aqueous solution of orthophosphoric acid having a $P_2O_5$ content of from about 15% to about 65% by weight.

Condensed phosphoric acid contains any quantity of one or more polyphosphoric acids and/or metaphosphoric acids and any such acid can be employed in this invention. The polyphosphoric acids include pyrophosphoric acid and other polymers from the tri- to the nonapolymer and higher. The properties and compositions of the condensed phosphoric acids vary with the $P_2O_5$ content of condensed phosphoric acid as dicussed in Van Wazer, Phosphorus and its Compounds, Interscience Publishers, Inc., New York, N.Y., volume I (1958), and shown by Table 12–1, page 748. Although, in general, for the instant invention any condenesd phosphoric acid is suitable as the acid source, the preferred condensed phosphoric acids are liquid mixtures ranging from about 72 percent $P_2O_5$ by weight which contains about 89.4 percent orthophosphoric acid and 10.6 percent pyrophosphoric acid to about 85 percent $P_2O_5$ by weight which contains about 1.3 percent orthophosphoric acid, 1.8 percent pyrophosphoric acid, 2.4 percent tripolyphosphoric acid, and about 94 percent of polyphosphoric acid polymers higher than tripolyphosphoric acid.

Either orthophophoric acid or condensed phosphoric acids are used to maintain the pH of the mixture of calcium oxide and sugar beet diffusion juice from about 7 to about 11.9. Generally, the amount of calcium oxide used in accordance with this invention will bring the pH of the mixture of calcium oxide and sugar beet diffusion juice to at least about 12, and preferably from about 12 to about 12.5. The pH of this mixture is then reduced by one of the aforementioned acids to a pH of from about 7 to about 11.9, preferably from about 9.5 to about 11.5.

Phosphoric acid, either condensed or ortho can be added in any convenient manner and/or concentration. For example, the acid can be metered into the mixture of calcium oxide and beet diffusion juice to lower the pH to the desired level.

The reaction of the phosphoric acid with the calcium oxide diffusion juice mixture results in the formation of a two phase system a liquid phase comprising the sugar beet diffusion juice and a solid phase comprising a calcium phosphorus containing material, colloidal in nature, which is generally made up of various hydroxylapatites having the based formula $$[Ca_5(OH)(PO_4)_3]xY \cdot H_2O$$

$x$ is a whole number from 1 to 10, Y is a whole number from 1 to 10 or zero. Although the calcium phosphorus containing material is made up of various hydroxylapatites, the material is predominantly a basic tricalcium phosphate having the formula $Ca_{10}(OH)_2(PO_4)_6$.

These apatites have a large surface area, and consequently are useful in purifying the sugar beet diffusion juice. Impurities in the sugar beet diffusion juice include organic matter, inorganic matter, coloring matter and the like, and are absorbed by the calcium phosphorus containing material, and/or are removed along with the calcium phosphorus containing material. A polyelectrolyte is employed to render the two phase system separable, in order that colloidal calcium phosphorus containing materials can be separated from the liquid phase.

After separating the calcium phosphorus containing material from the beet diffusion juice, no waste disposal problem is created as this material can be advantageously used as an animal feed supplement. The amount solid of material produced by the novel process of this invention varies depending on the amount of cacium oxide used, for example, when about 0.4% by weight is employed about 20 pounds of material per ton of beets is produced.

Generally useful animal feed supplements can have a calcium to phosphorus ratio of from about 1.3:1 to about 3.1:1. In areas where low calcium content feeds such as corn silage and urea, are used, the feed supplement can have a calcium to phosphorus ratio of about 1.7:1 to about 3:1, and in some cases about 3.6:1. A suitable supplement in these regions would be the reaction product produced in accordance with this invention, which has a calcium to phosphorous ratio of about 1.8:1. In areas where high calcium content feeds, such as legume hay, the feed supplement can have a calcium to phosphorus ratio of about 1.3:1 to about 1.6:1. A suitable supplement for these regions is the reaction produced in accordance with this invention, with a subsequent addition of more phosphoric acid. It is desirable to use feed grade phosphoric acid because of its low cost.

The synthetic or natural polyelectrolytes that can be employed in accordance with the novel process of this invention to render the two phase system separable include anionic, cationic and nonionic polyelectrolytes.

The anionic polyelectrolytes which can be employed in accordance with the present invention are organic polymers characterized as consisting of linear carbon to carbon chains (polyalkanes) obtained by vinyl polymerizing one or more vinylidene monomers bearing a carboxylic or sulfonic acid group, or an alkali metal salt of such acidic groups. Such polymers are homopolymers of these anionic functional monomers or interpolymers thereof with other suitable vinylidene monomers capable of undergoing vinyl polymerization. In such interpolymers, it is essential that sufficient carboxylic or sulfonic acid bearing monomers, or salts thereof, or such monomers with other monomers containing water-dispersing groups be present in the finished polymer to render it water-dispersible. Usually, a minimum of at least about 50 mole percent of the combined monomer moieties would bear water dispersing groups in order to insure that the resulting polymer is properly water-dispersible. Also, it is essential that a minimum of about 4 mole percent of the monomer moieties combined in the finished polymer should bear an anionic substituent of the specified class of sulfonic, sulfonate, carboxylic and carboxylic groups.

The term "water-dispersible" means that the polyelectrolyte at least $5.0 \times 10^{-7}$ gram will either dissolve in 100 grams of water at 25° C. or that a visually continuous dispersion or suspension of at least $5.0 \times 10^{-7}$ grams can be made in 100 grams of water at 25° C.

A species of anionic polyelectrolyte for use in accordance with the present invention is a homopolymer of an alkali metal salt of vinyl benzene sulfonic acid. Similar polymers correspond to water-dispersible copolymers prepared by the vinyl polymerization of a major proportion of vinyl benzene sulfonic acid, or an alkali metal salt thereof, and a minor proportion of a monomer copolymerizable therewith such as acrylamide, methacrylamide, acrylonitrile, methacrylonitrile, styrene, vinyl toluene, methyl acrylate and the like. For good results, such polymeric agents should have a molecular weight of at least 1,000 to about 1,000,000.

Another variety of anionic polyelectrolyte suitable for use in accordance with the invention is constituted by water-dispersible copolymers of styrene and maleic anhydride. Such copolymers are generally employed in the form of the alkali metal salts thereof, preferably the sodium salt, although the acid form obtained by acid hydrolysis of the anhydride rings may also be employed. In order to obtain the advantages of the invention, it is necessary that the styrene maleic anhydride copolymers have molecular weights of at least 1,000 to about 100,000.

Anionic acrylic polymers that can be employed in the present invention are water-dispersible substantially linear polymers obtained by the vinyl polymerization of acrylic acid, methacrylic acid, sulfoethyl acrylate, carboxyethyl acrylate or water-soluble salts of the foregoing acidic monomers or by copolymerization of the acidic monomers, or alkali metal salts thereof, with suitable amounts up to about 96 mole percent of other vinyl monomers such as acrylamide and methacrylamide.

Other suitable anionic acrylic polymers are obtained as the vinyl polymerization products of acrylamide or methacrylamide, or as the copolymerization products of such monomers with other suitable monomers including, for example, acrylonitrile, methacrylonitrile, lower alkyl esters of the acrylic acids, vinyl alkyl ethers and the like monoethylenically unsaturated compounds. During the polymerization reaction or thereafter with appropriate treatments, carboxyamide moieties of the polymer are hydrolyzed to provide a desired number of anionic carboxylic or carboxylate groups. Generally, at least about 4 mole percent of the monomer moieties in the finished polymer have anionic substituents. Usually such copolymers are prepared in reaction mixtures containing at least about 85 mole percent of the acrylamide or methacrylamide and not more than about 15 mole percent of the other monomers.

Anionic polymeric agents having at least about 4 mole percent of the monomer moieties having anionic substituents can also be produced by hydrolysis of preformed non-ionic polymers. For example, vinyl polymerized forms of acrylonitrile or methacrylonitrile can be hydrolyzed by reacting them with an aqueous metal hydroxide solution to convert the nitrile groups to the corresponding alkali metal carboxylate groups. Similarly, polymers or copolymers or alkyl esters of unsaturated acids can be saponified with an alkali metal hydroxide to convert ester groups to alkali metal carboxylate groups.

Cationic polyelectrolytes used in the invention are water-dispersible organic polymers characterized as containing in or attached along the polymeric chain a plurality of amino, imino or quaternary ammonium groups.

Representative of such cationic, nitrogenous polymers are homopolymers and water-soluble copolymers of one or more monomers such as N-vinylpyridine and substituted derivatives thereof; mono-, di, or trialkylammonium salts, e.g., vinyl benzyl trimethylammonium chloride; allylamine and N-alkyl substituted derivatives thereof, aminoethyl acrylate hydrochloride or aminoethyl methacrylate hydrochloride and, in general, any ammonium or substituted ammonium alkyl acrylate or methacrylate such as N-methyl- of N,N-dimethyl-aminoalkyl acrylate or methacrylate, wherein the alkyl groups contain 2 or 3 carbons, or the like. Other suitable cationic, nitrogenous polymers are obtained when a nitrogen containing monomer is copolymerized with one or more other monoethylenically unsaturated monomers capable of undergoing vinyl polymerization, provided that the resulting copolymer is water-dispersible and essentially free of anionic substituents. In such copolymers, at least about 5 mole percent, preferably at least 10 mole percent, of the monomers combined in the copolymer should be cationic, nitrogen containing monomers. Suitable monoethylenically unsaturated monomers to be copolymerized with cationic monomers include acrylamide, methacrylamide, acrylonitrile, the lower alkyl esters of acrylic and methacrylic acid, vinyl methyl ether, N-vinyl oxazolidinone, N-vinyl pyrrolidinone and the like. It should be noted that for the purposes of preparing cationic polymers for the present invention, the amide groups such as in acrylamide, and nitrile groups, such as in acrylonitrile, are not sufficiently cationic. However, monomers containing these groups can be employed in conjunction with other nitrogenous, cationic monomers to provide effective cationic polymers.

When the comonomers employed in the preparation of cationic organic polymers embody water-dispersing groups, such comonomers may be present in amounts up to 95 mole percent of the combined moieties in the finished cationic, nitrogenous polymer. When hydrophobic comonomers such as the alkyl esters of acrylic and methacrylic acids or styrene are interpolymerized with the cationic monomers, it is generally required, in order to produce a water-soluble polymer, that at least about 60 mole percent of the combined monomer moieties be hydrophilic, i.e., bearing water-dispersing groups.

A preferred class of cationic polymers is represented by water-dispersible polyethylenimines of high molecular weight. Substituted polyethylenimines and the mineral acid and quaternary ammonium salts thereof. Some polyethylenimines suitable for use in the invention can be represented by the formula:

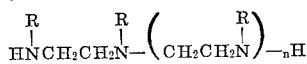

wherein R is hydrogen or methyl and $n$ has a value of at least 400, preferably of at least 2,000. Also, the various salts of these polymers such as the interreaction products thereof with hydrochloric, sulfuric, phosphoric, carbonic and acetic acids are efficient cationic polymers.

The vinyl benzyl quaternary ammonium compounds preferred for use in the present invention are the homopolymers of vinyl benzyl quaternary ammonium salts or copolymers of a vinyl benzyl quaternary ammonium compound with acrylamide, methacrylamide or water-soluble N-alkyl substituted derivatives thereof. Said copolymers may contain in polymerized form a very small amount up to about 95 mole percent of the acrylic comonomer. These polymers and copolymers contain a plurality of groups having the following structure:

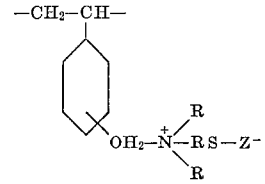

wherein each R represents a lower alkyl radical containing from 1 to 4 carbon atoms, inclusive, and Z represents an anion such as hydroxyl, chloride, bromide, iodide, hydrosulfate, dihydrophosphate or the like.

Nonionic polymers include polyacrylamide, polyacrylonitrile, and polymethacrylonitrile, having a molecular weight of at least 1,000. Certain of the foregoing cationic or anionic polymers as well as other related polymers operable in the invention can be prepared by modification of preformed polymers. Thus, for example, a linear high polymer of a vinylaryl hydrocarbon, such as styrene, vinyl toluene, α-methylstyrene, vinylxylene or the like can be sulfonated under controlled conditions to produce a water-dispersible, substantially linear polymer sulfonate useful as an anionic polyelectrolyte in the invention. Alternatively, such a polyvinylaryl hydrocarbon can be chloromethylated, for example, by reaction with formaldehyde and hydrogen chloride, and the resulting chloromethylated polymer can be reacted with a tertiary amine to produce a cationic polymer containing a plurality of polymerized vinyl benzyl quaternary ammonium moieties. Similarly, a homopolymer of a vinyl benzyl halide can be reacted with a tertiary alkyl amine to produce the corresponding cationic quaternary ammonium substituted polymer.

The polyelectrolytes useful in accordance with the process of this invention can have molecular weights from about 1,000, to about 1,000,000 up to about 1,700,000. The viscosities can be determined by standard methods, such as by using a Brookfield viscometer. Generally the viscosities of 1% solutions in a suitable solvent at 25° C. are from about 7 centipoise (cps.) to about 10,000 cps.

Preferred anionic polyelectrolytes include partially hydrolyzed polyacrylamide, said polymer having at least 4 mole percent of the monomer moieties bearing anionic substituents, and the viscosity of a 1% solution of said polymer at 25° C., pH 7, using a Brookfield viscometer at 20 r.p.m. being about 4500 cps. and sodium alginate, viscosity of a 1% soln being 60 centipoises at pH 7 and 25° C. using a Brookfield viscometer. Preferred cationic include polyamine, viscosity of a 1% soln being 270 centipoise at a pH of 12-14 at 25° C. using a Brookfield viscometer, a dialkyldimethylammonium chloride polymer, and a polyethyleneimine having a molecular weight of about 10,000. Preferred nonionic polyelectrolytes include polyacrylamide, a 1% solution at 25° C., pH 5.5 has a viscosity of 600 cps. and polyacrylonitrile.

The amount of polyelectrolyte used can be from about 0.5 parts per million (p.p.m.) to about 500 p.p.m. and preferably from about 2 p.p.m. to about 100 p.p.m. based on the weight of the juice. Although amounts in excess of 500 p.p.m. can be used, it has been found that removal rates of some polyelectrolytes are not improved, in fact, smaller amounts of some polyelectrolytes give better performance than do larger amounts. The polyelectrolyte can be used in any convenient manner, for example, it can be directly added as a solid and/or concentrated form to the two phase system or a dilute aqueous dispersion or solution of the polyelectrolyte can be prepared and added to two phase system. It is preferred to add a solution or dispersion of the polyelectrolyte, slowly, to the two phase system.

There is no set time for the polyelectrolyte to be in contact with the solid phase, as long as there is a good dispersion throughout the solid phase. Although the polyelectrolyte can be in contact with the solid phase for long periods of time, for example, 5 minutes, adequate removal rates are obtained when the polyelectrolyte is in contact with the solid phase for only about a minute.

The improvement in removal rates can readily be seen from the following tests. The gravity filtration rates of 100 cc. of $H_3PO_4$-CaO-polyelectrolyte treated juices are compared to that of the CaO–$CO_2$ treated juice. Results are given below.

TABLE I.—GRAVITY FILTRATION RATES

| Treatment of juice, pH, 11.2, 25° C. | Concentration of partially hydrolyzed polyacrylamide [1] | Polyelectrolyte concentration, p.p.m. | Gravity filtration, 20 cc./minute |
|---|---|---|---|
| 2% CaO-$CO_2$ | | | 2–4 |
| 1% CaO-$H_3PO_4$ | 0.05 | 50 | 5 |
| 1% CaO-$H_3PO_4$ | 0.05 | 100 | 1.1 |
| 0.5% CaO-$H_3PO_4$ | 0.005 | 5 | 4 |
| 0.5% CaO-$H_3PO_4$ | .005 | 10 | 2.3 |
| 0.5% CaO-$H_3PO_4$ | .005 | 15 | 1 |
| 0.5% CaO-$H_3PO_4$ | .001 | 3 | 3.3 |

[1] Viscosity, 4,500 cps. Brookfield, pH 7, 25° C., percent.

As can be seen from the above table the filtration rates of the juices treated with CaO–$H_3PO_4$ and a polyelectrolyte are about equal or better than the CaO–$CO_2$ treated juice indicating that the calcium phosphorus material and the impurities can readily be removed.

The novel process requires only 1 removal step to give a juice of satisfactory purity, however, a second separation step can be carried out but there is little or no improvement in purity. It will be appreciated that generally the amount of separation equipment will be less than is needed for the calcium oxide-carbon dioxide process.

When vacuum or pressure filtration is used in accordance with this invention, the amount of polyelectrolyte used should be from about 5 p.p.m. to about 500 p.p.m. and preferably from about 15 p.p.m. to about 75 p.p.m.

Likewise, when centrifugation is used, the amount of polyelectrolyte used should be from about 1 p.p.m. to about 100 p.p.m. and preferably from about 3 p.p.m. to about 15 p.p.m.

The novel process of this invention can be carried out at a temperature of from about 15° C. to about 90° C. It is preferred that the temperature be from about 65° C. to about 85° C. as this temperature gives good removal rates probably due to the lower viscosity of the juice. A more stable diffusion juice also is obtained at these temperatures.

In accordance with this invention, any suitable mixing vessel or tank may be used. A suitable mixing vessel is a prelimer which is in essence a tank about 6 to 8 feet long divided into 6 compartments by baffles. There are mechanically driven panels in the bottom of each compartment so that the juice is mixed. The diffusion juice enters the prelimer at the top of one end and the lime slurry is metered in at the opposite end.

The solid phase can be separated from the diffusion juice by any convenient method such as that of filtration, vacuum filtration, centrifugation, sedimentation and the like. As mentioned before, the amount of polyelectrolyte needed depends upon the mechanism used to separate the solid phase from the diffusion juice.

The following non-limiting examples are presented to further illustrate the invention. All parts, proportions and percentages are by weight unless otherwise stated.

EXAMPLE I

About 2,000 parts of sugar beet diffusion juice are metered into the top of a prelimer at the rate of 18 to 18.5 liters per minute. The temperature of the juice is kept at about 78° C. A 20% aqueous slurry of calcium oxide is prepared and about 8.5 parts are metered, in at the opposite end. The pH of the mixture in the prelimer is about 11.8. To the limed juice coming from the prelimer is added at the rate of 140 to 150 cc. per minute about 5.5 parts of an aqueous solution of orthophosphoric acid, having a $P_2O_5$ content of about 18% by weight, to maintain the pH at about 11.2. The juice continues to flow to a separator tank and just before the juice enters into the tank, the polyelectrolyte, partially hydrolyzed polyacrylamide, viscosity of a 1% soln at 25° C. using a Brookfield being 4500 centipoise is added at a rate of 540 to 550 cc./min. so there is present in the limed juice about 15 p.p.m. to form a separable two phase system. The solid material is then separated from the beet diffusion juice and analysis of both the juice and the solid material is made. The purity of the diffusion juice is about 91. Analysis of the solid material showed that it had a calcium to phosphorous ratio of about 1.8:1. This material is suitable as an animal feed supplement as is, or more phosphoric acid can be added to give a calcium to phosphorus ratio of about 1.3:1.

Substantially similar results are obtained when the polyelectrolyte is a polyamine, a 1% solution having a viscosity of about 1.25 centipoise at 25° C. using a Brookfield viscometer. Good results are also obtained when a polystyrene maleic anhydride polyelectrolyte is used, a 1% solution having a viscosity of about 7 centipoise at 25° C. using a Brookfield viscometer.

EXAMPLE II

Example II is carried out in exactly the same manner as Example I except that the temperature is kept at about 25° C. The results are substantially the same as in Example I.

EXAMPLE III

Example III is carried out in exactly the same manner as Example I except that the polyelectrolyte is sodium alginate, added in an amount of about 100 p.p.m. The viscosity of a 1% solution is about 60 centipoise using a Brookfield viscometer at 25° C. The polyelectrolyte is added in the form of an aqueous solution. Substantially the same results as in Example I are obtained.

What is claimed is:

1. A process for the purification of impure beet diffusion juice, which process comprises (1) forming a mixture of calcium oxide and impure beet diffusion juice, said calcium oxide being present in an amount of from about 0.2% to about 2%, based on the weight of said juice, and the temperature of said juice being from about 15° C. to 90° C. (2) maintaining the pH of said mixture at from about 9.5 to about 11.5 by the addition of phosphoric acid (3) adding a polyelectrolyte of a nonionic, cationic or anionic type having a molecular weight over 1,000; said electrolyte being present in an amount of from about 0.5 p.p.m. to about 500 p.p.m. based on the weight of said juice to form a separable 2 phase system, (4) separating said solid phase from said juice by a treatment selected from the group consisting of filtration, centrifugation, and sedimentation to obtain beet diffusion juice having an apparent purity of at least 89 and a solid material comprising a calcium phosphorus containing material suitable as an animal feed supplement.

2. A process according to claim 1 wherein calcium oxide is present in an amount of from about 0.4% to about 1% by weight based on the weight of said juice.

3. A method according to claim 2 wherein the temperature of said juice is about 65° C. to about 85° C.

4. A process according to claim 1 wherein the temperature of said juice is about 65° C. to about 85° C.

5. A process according to claim 4 wherein calcium oxide is present in an amount from about 0.4% to about 1% by weight based on the weight of the juice.

6. A process according to claim 4 wherein the viscosity of a 1% solution of the polyelectrolyte is from about 7 cps. to about 10,000 cps. at 25° C.

7. A process according to claim 4 wherein the polyelectrolyte is an anionic polyelectrolyte selected from the group consisting of a partially hydrolyzed polyacrylamide, the viscosity of a 1% by weight solution at 25° C. and pH 7 being about 4500 cps. using a Brookfield viscometer, the sodium salt of poly alginate, the viscosity of a 1% by weight solution at 25° C. and pH 7 being about 60 cps. using a Brookfield viscometer, and polystyrene maleic anhydride the viscosity of a 1% by weight solution at 25° C. and pH 7 being about 10 cps. using a Brookfield viscometer, said polyelectrolyte being present in an amount from about 2 p.p.m. to about 100 p.p.m. based on the weight of said juice.

8. A method of claim 7 wherein the phosphoric acid source is an aqueous solution of orthophosphoric acid having a $P_2O_5$ content of about 15% to about 65% by weight.

9. A process according to claim 8 wherein the polyelectrolyte is an anionic polyelectrolyte selected from the group consisting of a partially hydrolyzed polyacrylamide, the viscosity of a 1% by weight solution at 25° C. and pH 7 being 4500 cps. using a Brookfield viscometer, the sodium salt of poly alginate, the viscosity of a 1% by weight solution at 25° C. and pH 7 being 60 cps. using a Brookfield viscometer and polystyrene maleic anhydride, the viscosity of a 1% by weight solution at 25° C. and pH 7 being about 10 cps. using a Brookfield viscometer, said polyelectrolyte being present in an amount from about 2 p.p.m. to about 100 p.p.m. based on the weight of said juice.

References Cited

UNITED STATES PATENTS

| | | | |
|---|---|---|---|
| 2,817,649 | 12/1957 | Contois | 127—46X |
| 2,937,143 | 5/1960 | Goren | 127—50X |
| 3,166,443 | 1/1965 | Miles | 127—55 |
| 3,290,173 | 12/1966 | Marino | 127—46X |
| 3,418,165 | 12/1968 | Rabe | 127—46X |

OTHER REFERENCES

C.A. 64: 20513g (1966).

MORRIS O. WOLK, Primary Examiner

S. MARANTZ, Assistant Examiner

U.S. Cl. X.R.

99—2; 127—50